No. 856,040. PATENTED JUNE 4, 1907.
D. A. DORSEY & A. R. MITCHELL.
ICE CUTTING MACHINE.
APPLICATION FILED MAR. 23, 1907.
2 SHEETS—SHEET 1.
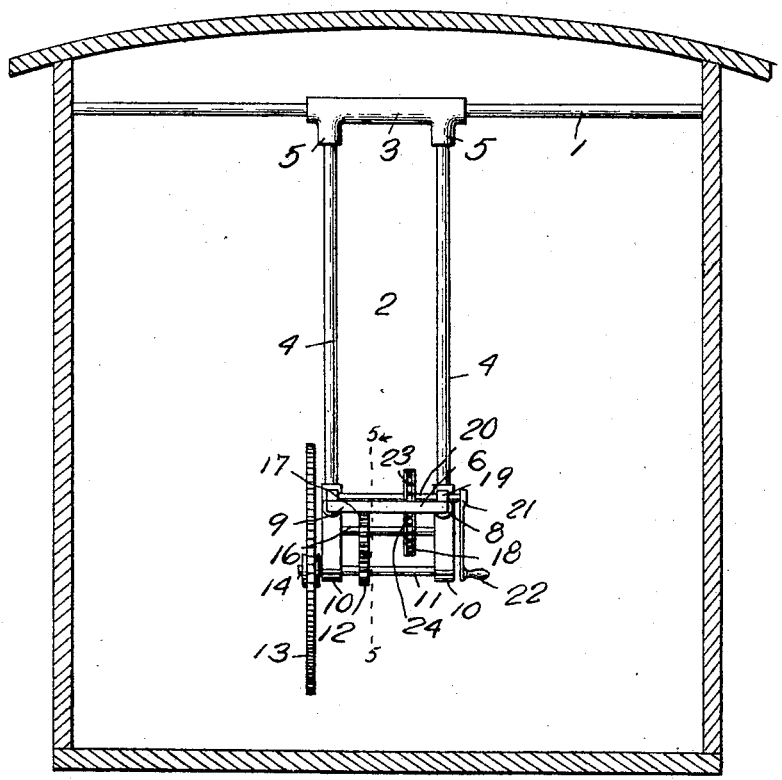
Fig. 1.
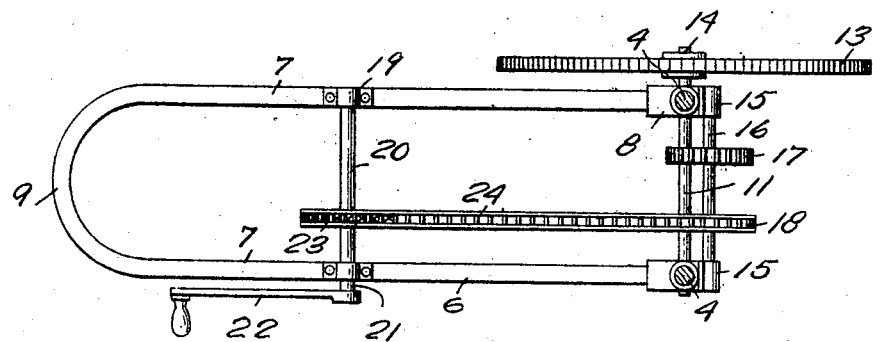
Fig. 4.
Witnesses
G. R. Thomas
M. F. Miller
Inventors
D. A. Dorsey
A. R. Mitchell
By 
Attorneys No. 856,040. PATENTED JUNE 4, 1907.
D. A. DORSEY & A. R. MITCHELL.
ICE CUTTING MACHINE.
APPLICATION FILED MAR. 23, 1907.

2 SHEETS—SHEET 2.

Witnesses
G. R. Thomas
M. F. Miller

Inventors
D. A. Dorsey
A. R. Mitchell

By
Attorneys

UNITED STATES PATENT OFFICE.

DANA A. DORSEY AND AUGUSTUS R. MITCHELL, OF MIAMI, FLORIDA.

ICE-CUTTING MACHINE.

No. 856,040. Specification of Letters Patent. Patented June 4, 1907.

Application filed March 23, 1907. Serial No. 364,123.

*To all whom it may concern:*

Be it known that we, DANA A. DORSEY and AUGUSTUS R. MITCHELL, citizens of the United States, residing at Miami, in the county of Dade, State of Florida, have invented certain new and useful Improvements in Ice-Cutting Machines; and we do hereby declare the following to be a full, clear, and exact description of the invention, such as will enable others skilled in the art to which it appertains to make and use the same.

This invention relates to new and useful improvements in ice cutting machines, and it has particular reference to a machine embodying a movable frame and a disk cutting blade or saw carried thereby.

In connection with a machine of the above type, the invention aims as a primary object to provide a frame from which the operative parts are suspended, said frame being itself of novel construction and arrangement.

The invention aims as a further object to provide a novel construction, combination and arrangement of parts, the details of which will appear in the course of the following description, wherein reference is had to the accompanying drawings forming a part of this specification, like characters of reference designating similar parts throughout the several views, in which:—

Figure 2:
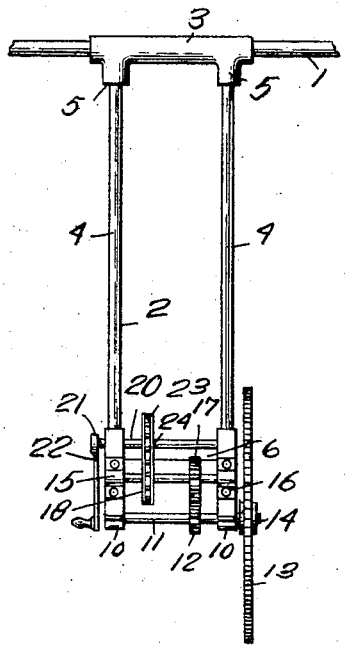
Figure 3:
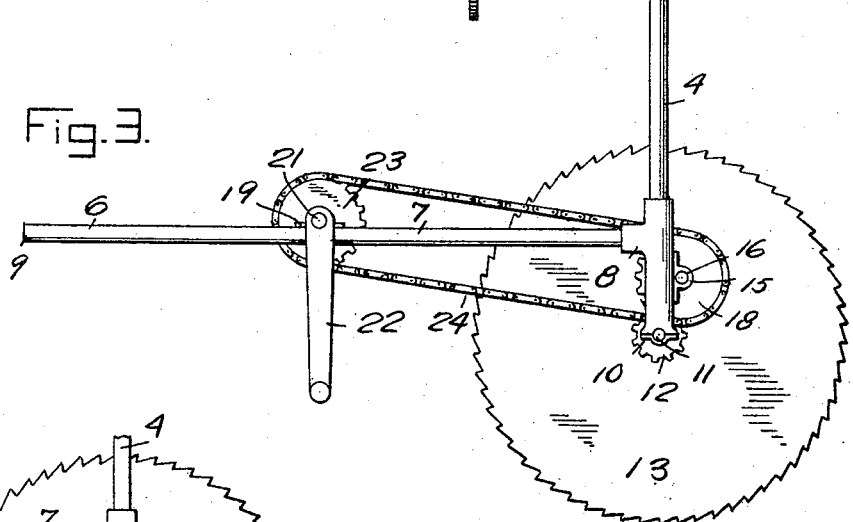
Figure 5:
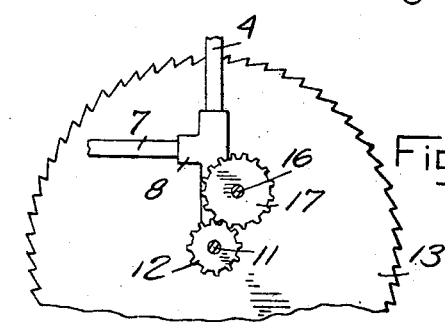

Figure 1 is a front plan view of a machine constructed in accordance with the present invention. Fig. 2 is a rear plan view thereof. Fig. 3 is a side elevation thereof. Fig. 4 is a top plan view thereof, portions being broken away to more clearly illustrate the parts. Fig. 5 is a central longitudinal section on the line 5—5 of Fig. 1, looking in the direction of the arrow.

Referring specifically to the accompanying drawings, the numeral 1 designates a horizontal bar which is mounted in the upper part of a portable body, such for instance as a wagon. A frame 2 is suspended from the bar 1, and to this end said frame includes a sleeve 3, loosely surrounding said bar in rotatable and slidable relation thereto. Depending from the sleeve 3 are vertical bars 4, which may have their upper ends threaded into bosses 5, provided on said sleeve, or which may be cast integral therewith. A U-shaped frame 6 has its legs 7 threaded at their ends into bosses 8, provided upon the bars 4 at a short distance from the lower ends thereof, the bow-shaped portion 9 of the frame 6 constituting a handle, by means of which the frame 2 and its associated parts as an entirety, may be rocked or slid with relation to the bar 1. The legs 4 are constituted at their lower ends with bearings 10, in which is journaled a transverse shaft 11, carrying a pinion 12 between said bearings, and a disk 13 on its projecting end 14, the disk 13 being preferably formed with saw teeth or other suitable cutting edge. The bars 4 at a short distance above their lower ends, are provided with bearings 15 which constitute support for a transverse shaft 16, arranged in parallelism to the shaft 11, and carrying a pinion 17 meshing with the pinion 12, and a sprocket wheel 18 spaced away from the pinion 17. At some distance from the bow-shaped end 9 of the frame 6 and on the said frame, bearings 19 are provided which support a transverse shaft 20, having a projecting end 21, upon which is mounted a crank handle 22. Between the bearings 19, the shaft 20 carries a sprocket wheel 23, in the same plane as the sprocket wheel 18, and serving to drive the latter by means of a chain 24.

The manner of use will be readily apparent from the foregoing description. The block of ice to be cut is slid beneath the frame 2, and said frame is then slid upon the bar 1 with relation to said block, in order that the cutting disk 13 may be disposed along the line at which it is desired to make the kerf. The operator then grasps the bow-shaped portion 9 of the frame 6 with one hand, and with his other hand turns the crank handle 22 to rotate the shaft 20, the power of which is transmitted through the gearing described, to the saw 13. The frame 2 as an entirety, may be swung upon the bar 1 to cause the disk 13 to take into the ice in forming the kerf or to withdraw said disk from the kerf thus formed.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

A machine of the type set forth, comprising a horizontal bar, a frame loosely suspended therefrom for slidable and pivotal movement with relation to said bar, said frame comprising a sleeve loosely surrounding said bar and parallel vertical bars depending from said sleeve, a transverse shaft journaled between the ends of said vertical bars and having an end projecting therebeyond, a cutter fixed on said projecting end, a second shaft journaled between said bars above said first named shaft, gearing between said shafts, a U-shaped frame having its legs fixed at their ends to said vertical bars, a transverse shaft mounted between the legs of said U-shaped frame, a crank handle carried by said last named shaft, and gearing between said last named shaft and said second named shaft.

In testimony whereof, we affix our signatures, in presence of two witnesses.

DANA A. DORSEY.
AUGUSTUS R. MITCHELL.

Witnesses:
JOHN C. GRAMLING,
RUTH RAULERSON.